(12) United States Patent
Pillmore (10) Patent No.: US 10,251,339 B2
(45) Date of Patent: Apr. 9, 2019

(54) LAWN MOWER COVER

(71) Applicant: Robert M. Pillmore, Lakewood, CO (US)

(72) Inventor: Robert M. Pillmore, Lakewood, CO (US)

( * ) Notice: Subject to any disclaimer, the term of this patent is extended or adjusted under 35 U.S.C. 154(b) by 517 days.

(21) Appl. No.: 14/456,137

(22) Filed: Aug. 11, 2014

(65) Prior Publication Data

US 2015/0128550 A1    May 14, 2015

Related U.S. Application Data

(60) Provisional application No. 61/901,610, filed on Nov. 8, 2013.

(51) Int. Cl.
*A01D 34/00* (2006.01)
*A01D 34/81* (2006.01)

(52) U.S. Cl.
CPC .................. *A01D 34/81* (2013.01)

(58) Field of Classification Search
CPC ...................................... A01D 34/81
USPC ................................. 56/320.1, 229
See application file for complete search history.

(56) References Cited

U.S. PATENT DOCUMENTS

| | | | | |
|---|---|---|---|---|
| 2,578,880 A | * | 12/1951 | Doyle | A01D 34/63 180/19.1 |
| 2,909,885 A | * | 10/1959 | Smith | A01D 34/78 56/11.9 |
| 3,056,249 A | * | 10/1962 | Shaw | A01D 34/6806 56/12.6 |
| 3,212,244 A | * | 10/1965 | Wilgus | A01D 34/74 56/11.9 |
| 3,581,480 A | * | 6/1971 | O'Connor, III | A01D 34/828 320/111 |
| 3,722,820 A | * | 3/1973 | Klint, Jr. | A01D 43/14 239/129 |
| 4,051,648 A | * | 10/1977 | Uhlinger | A01D 34/826 56/17.5 |
| 4,158,280 A | * | 6/1979 | Thomas | A01D 43/06 56/16.6 |
| 4,159,614 A | * | 7/1979 | Thomas | A01D 34/6806 475/175 |
| 4,178,977 A | * | 12/1979 | Sur | A01D 34/001 135/115 |
| 4,194,345 A | * | 3/1980 | Pioch | A01D 34/81 56/17.5 |
| D256,150 S | | 7/1980 | Lofton | |
| 4,232,505 A | * | 11/1980 | Walto | A01D 34/416 56/12.7 |
| D260,149 S | | 8/1981 | Harris | |

(Continued)

*Primary Examiner* — Thomas B Will
*Assistant Examiner* — Mai T Nguyen
(74) *Attorney, Agent, or Firm* — Leyendecker & Lemire, LLC (57) ABSTRACT

An automobile shaped lawn mower cover is described. Embodiments of the present invention include an automobile shaped lawn mower cover having one or more openings and at least one hinged panel. The automobile shaped cover can generally be aesthetically pleasing and can be implemented as a functional cover for a rotary lawn mower. Embodiments of the automobile shaped cover can include a plurality of automobile designs spanning all major car manufacturers. Typically, the automobile shaped cover can be adapted to work with existing lawn mowers.

10 Claims, 5 Drawing Sheets

(56) References Cited

U.S. PATENT DOCUMENTS

| | | | | |
|---|---|---|---|---|
| 4,312,421 A * | 1/1982 | Pioch | ................... | A01D 34/826 |
| | | | | 181/202 |
| 4,333,302 A * | 6/1982 | Thomas | ................. | A01D 34/78 |
| | | | | 56/10.5 |
| 4,351,143 A * | 9/1982 | Lessig, III | ............. | A01D 34/82 |
| | | | | 56/17.5 |
| 4,753,346 A | 6/1988 | Tsuji | | |
| 4,899,526 A * | 2/1990 | Harris | ................... | A01D 34/81 |
| | | | | 264/46.6 |
| 5,274,988 A | 1/1994 | Bruce | | |
| 5,461,847 A * | 10/1995 | Strong | ................ | A01D 34/824 |
| | | | | 16/437 |
| D450,174 S | 11/2001 | Scott | | |
| 6,434,918 B1 * | 8/2002 | Csonka | ................. | A01D 34/82 |
| | | | | 56/12.8 |
| 6,666,008 B2 * | 12/2003 | Iida | ........................ | A01D 34/78 |
| | | | | 56/11.9 |
| 7,240,473 B2 * | 7/2007 | Docken | .............. | A01D 34/6818 |
| | | | | 242/404.3 |
| 7,293,782 B2 | 11/2007 | Jennings | | |
| D567,257 S | 4/2008 | Wilkens | | |
| D567,258 S | 4/2008 | Wilkens | | |
| D584,746 S | 1/2009 | Schreiner | | |
| 7,736,103 B1 * | 6/2010 | Leon | .................... | A01D 34/001 |
| | | | | 280/47.26 |
| D668,264 S | 10/2012 | Tiefenthaler | | |
| 8,336,282 B2 * | 12/2012 | Messina | ............... | A01D 34/008 |
| | | | | 56/320.1 |
| 8,468,788 B1 * | 6/2013 | Vastag | .................. | A01D 34/81 |
| | | | | 56/17.5 |
| 2003/0019198 A1 * | 1/2003 | Eavenson, Sr. | ........ | A01D 34/42 |
| | | | | 56/16.7 |
| 2004/0083701 A1 * | 5/2004 | Brower | ................ | A01D 34/826 |
| | | | | 56/320.1 |
| 2006/0043163 A1 | 3/2006 | Colbert | | |
| 2007/0295775 A1 | 12/2007 | Guenther | | |
| 2010/0154456 A1 | 6/2010 | Wilkins | | |
| 2014/0230394 A1 * | 8/2014 | Zerbarini | .............. | A01D 34/52 |
| | | | | 56/16.7 |

* cited by examiner

LAWN MOWER COVER

CROSS-REFERENCE TO RELATED APPLICATION

This application claims the benefit of, and incorporates in its entirety, U.S. Provisional Application No. 61/901,610, filed Nov. 8, 2013.

BACKGROUND

Walk behind lawn mowers have been around for a long time. However, the general design of the walk behind lawn mower has not changed much since they were first introduced. More specifically, most gasoline powered walk behind mowers have the same general design. An engine is placed on a platform having four wheels, with a rotating blade attached to the engine. The mower includes an extension for pushing the mower. Typically, the engine is left uncovered and susceptible to the elements. As such, the lawn mower is usually stored inside a building or with a cover. However, most covers on the market can only be used while storing the lawn mower.

A lawn mower cover that can be implemented while using the mower and that provides protection from the elements is needed.

DETAILED DESCRIPTION

Embodiments of the present invention include an automobile shaped lawn mower cover. In one embodiment, an aesthetically pleasing automobile design can be implemented as a functional cover for a push lawn mower. It is to be appreciated that the automobile shaped cover can include a plurality of automobile designs spanning all major car manufacturers. Typically, the automobile shaped cover can be implemented with existing push lawn mowers.

In one embodiment, the automobile cover can include a body and a plurality of attachment structures. Generally, the automobile cover can include openings in typical locations of where windows are present in an automobile. For instance, a front window, a rear window, and a plurality of door windows can be included in the automobile cover. Generally, a pull cord of the lawn mower can exit through the rear window opening of the automobile cover. The attachment structures can include snap fasteners, hook and loop patches, screws, nuts and bolts, et cetera. It is to be appreciated that a variety of different attachment structures can be implemented without exceeding a scope of the present invention.

In one embodiment, a top portion or roof of the automobile cover can be opened and closed. For instance, the roof of the automobile cover can have a hinged connection to the body of the automobile cover. The hinged roof can allow access to the engine of the lawn mower. In one embodiment, the automobile cover can be coupled to a handle assembly of the push lawn mower. For instance, the plurality of attachment structures can be implemented to secure the automobile cover to the handle assembly.

In one embodiment, a gas intake extension can be included to move a gas intake of the lawn mower to a gas intake of the automobile cover. For instance, a hose can be implemented to extend the gas intake of the lawn mower to a fabricated gas intake of the automobile cover.

In one embodiment, the automobile cover can include a plurality of riser structures that can be coupled to the push lawn mower. For instance, bolts can be implemented to couple the riser structures to the push lawn mower. Generally, each of the automobile covers can be manufactured to fit with the riser structures. As such, a user can easily swap different style automobile covers by implementing the riser structures.

Embodiments of the present invention further include an automobile shaped lawn mower. Generally, the automobile shaped lawnmower can include essential components of a lawn mower adapted to an automobile frame. For instance, a push lawn mower can be built to match an automobile frame. In one embodiment, a gas intake from the automobile shaped lawn mower can be matched up with a location of a gas intake from an automobile shape. For instance, most domestic vehicles have a gas intake on a left rear side of the car, and as such, the gas intake for the automobile shaped lawn mower can be located in a similar location if a US based automobile design is desired. In some embodiments, an exhaust of a lawn mower engine can be fabricated to match an automobile exhaust.

In an embodiment, the automobile shaped lawn mower can typically be built from the ground up modifying a standard push lawn mower design to fit with a particular automobile design. The automobile shaped lawn mower can be attractive, easy to handle, and can be displayed as an ornament with aesthetic value ascribed to the shape of the automobile body.

Although an automobile cover is mentioned, other types of vehicle covers are anticipated including, but not limited to, boats, planes, motorcycles, trucks, semi-trucks, and all-terrain vehicles. Similarly, the automobile shaped lawn mower can be manufactured to look like other types of vehicles. In some embodiments, the lawn mower cover can have other designs including, but not limited to, football helmets, hockey helmets, and other sports helmets.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The terms "lawn mower," "mower," "push mower," and "push lawn mower," as used in this specification and appended claims, refers to a rotary mower being either push or self-propelled and being either gasoline or electric.

A First Embodiment of a Lawn Mower Cover

Figure 1A:
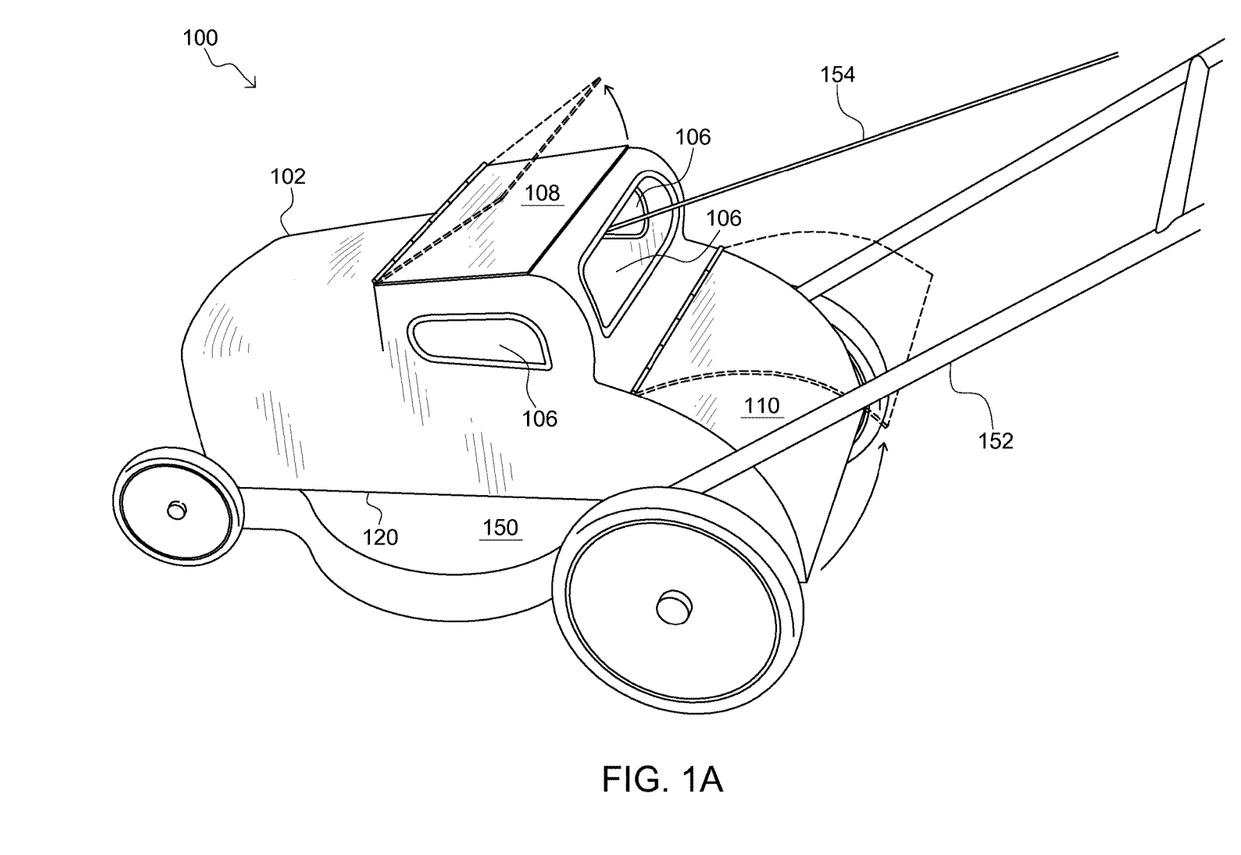
FIG. 1A is a perspective view of an automobile lawn mower cover according to one embodiment of the present invention.
Figure 1B:
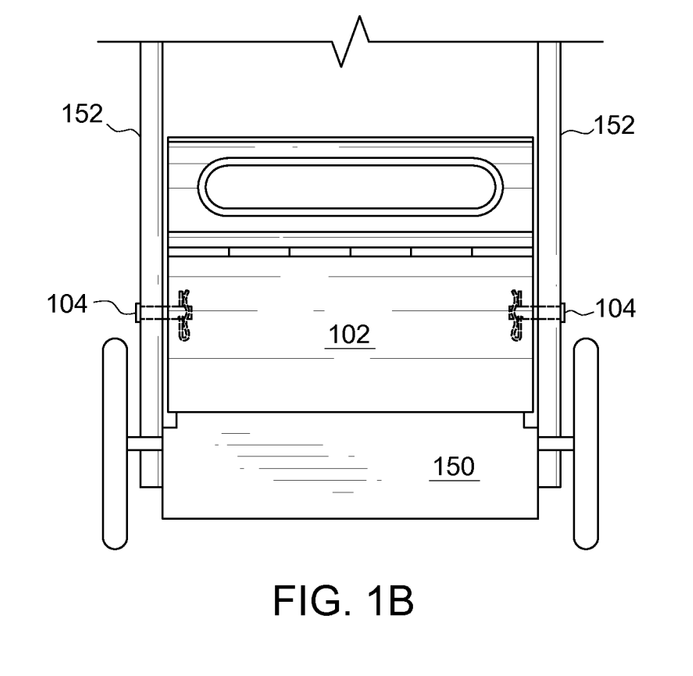
FIG. 1B is a back view of an automobile lawn mower cover according to one embodiment of the present invention.

Referring to FIGS. 1A-1B, a detailed diagram of an embodiment 100 showing a lawn mower cover is illustrated. The cover 100 can be generally shaped like a vehicle and be implemented with a lawn mower 150. For illustrative purposes only, the cover 100 is shown illustrated as an automobile. It is to be appreciated that the lawn mower cover 100 can be modeled after a variety of vehicles. Generally, the first embodiment cover 100 can be implemented with a variety of types of lawn mowers.

As shown in FIGS. 1A-1B, the cover 100 can generally include a body 102 and at least one attachment structure 104.

The body 102 can generally be shaped similar to a vehicle. As shown, the body 102 can be shaped like an automobile. To simulate automobile windows, the body 102 can include one or more openings 106. For instance, the one or more openings 106 can be included to simulate a rear window, a front window, and door windows. It is to be appreciated that depending on the type of automobile the body 102 is modeled after, the body 102 can include a variety of types and combinations of openings. Generally, a pull cord 154 of the lawn mower 150 can exit out a back opening 106 of the body 102 to the handle assembly 152. Typically, the back opening 106 can resemble a rear window of an automobile.

Generally, the body 102 can include one or more adjustable panels to provide access to the lawn mower 150. As shown in FIG. 1A, the body 102 can generally include a roof panel 108 and a rear panel 110. It is to be appreciated that the body 102 can include more or less adjustable panels without exceeding a scope of the present invention.

The roof panel 108 can be implemented to allow access to an engine of the lawn mower 150. In one embodiment, the roof panel 108 can be rotatably coupled to the body 102. For instance, the roof panel 108 can have a hinged connection to the body 102. As shown in FIG. 1A, the roof panel 108 can rotate from a closed position to an open position. In the open position, the roof panel 108 can allow access to the engine. For instance, a user can access a gas tank of the engine to fill with fuel. In another instance, the user can have access to common components of a lawn mower engine including, but not limited to, an oil dipstick and a choke.

The rear panel 110 can generally be located near a rear of the lawn mower 150. Generally, the rear panel 110 can be rotatably coupled to the body 102. For instance, the rear panel 110 can have a hinged connection to the body 102. Typically, the rear panel 110 can be included for lawn mowers having a clipping bag. For instance, the rear panel 110 can be rotated to an open position to allow the clipping bag to be attached to the lawn mower 150. When the clipping bag is not being used, the rear panel 110 can be rotated to the closed position.

Referring to FIG. 1B, a back view of the automobile cover 100 coupled to the lawn mower 150 is illustrated. The attachment structures 104 can be implemented to secure the body 102 to the lawn mower 150. In one embodiment, the attachment structures 104 can include a clevis pin. It is to be appreciated that other types of couplings can be implemented in the present invention. For instance, the attachment structures can include, but are not limited to, screws, bolts and nuts, thumb screws, and other types of fasteners.

Figure 2:
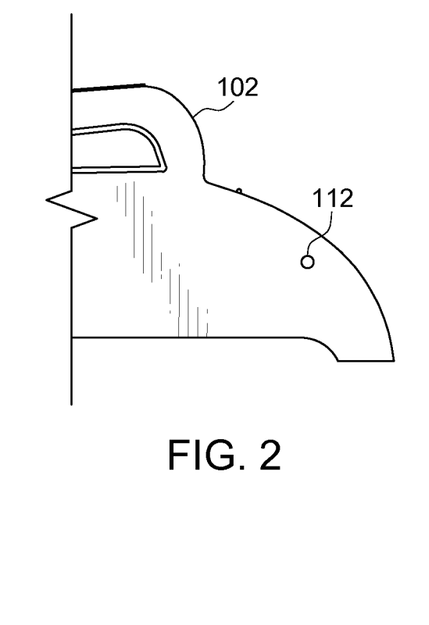
FIG. 2 is a side view of an automobile lawn mower cover according to one embodiment of the present invention.

Referring to FIG. 2, a side view of the body 102 is illustrated. As shown in FIG. 2, the body 102 can include a hole 112 located near a rear side of the body 102. It is to be appreciated that the other side of the body 102 can also include a hole. Typically, the holes 112 can be implemented to receive the attachment structure 104 and couple the body 102 to the lawn mower. For instance, a clevis pin is shown coupling the body 102 to the lawnmower 150 in FIG. 1B.

Typically, a handle assembly 152 of the lawn mower 150 will have one or more holes adapted for receiving a fastener. For instance, a thumb screw can be implemented to secure the handle assembly 152 to the lawn mower 150. In a typical implementation, one of the pre-drilled holes of the handle assembly 152 can be implemented to receive the attachment structure 104. As shown in FIG. 1B, the body 102 can couple to an interior side of the handle assembly 152. It is to be appreciated that depending on a type of lawn mower, the body 102 may attach to an exterior of the handle assembly.

In some embodiments, a bottom portion of the body 102 can include a barrier layer 120, as shown in FIG. 1A. For example, the barrier layer 120 can outline a bottom surface of the body 102. The barrier layer 120 can be implemented to protect the lawn mower 150 and provide vibration dampening between the body 102 and the lawn mower 150. Typically, the barrier layer 120 can be made from materials including, but not limited to, foam, rubber, and plastic. In one embodiment, the barrier layer 120 can be made from a semi-rigid material having vibration absorption qualities.

The first embodiment cover 100 has been described in detail as an automobile. It is to be appreciated that the components of the first embodiment cover 100 can be adapted to other vehicle types.

A Second Embodiment of a Lawn Mower Cover

Figure 3:
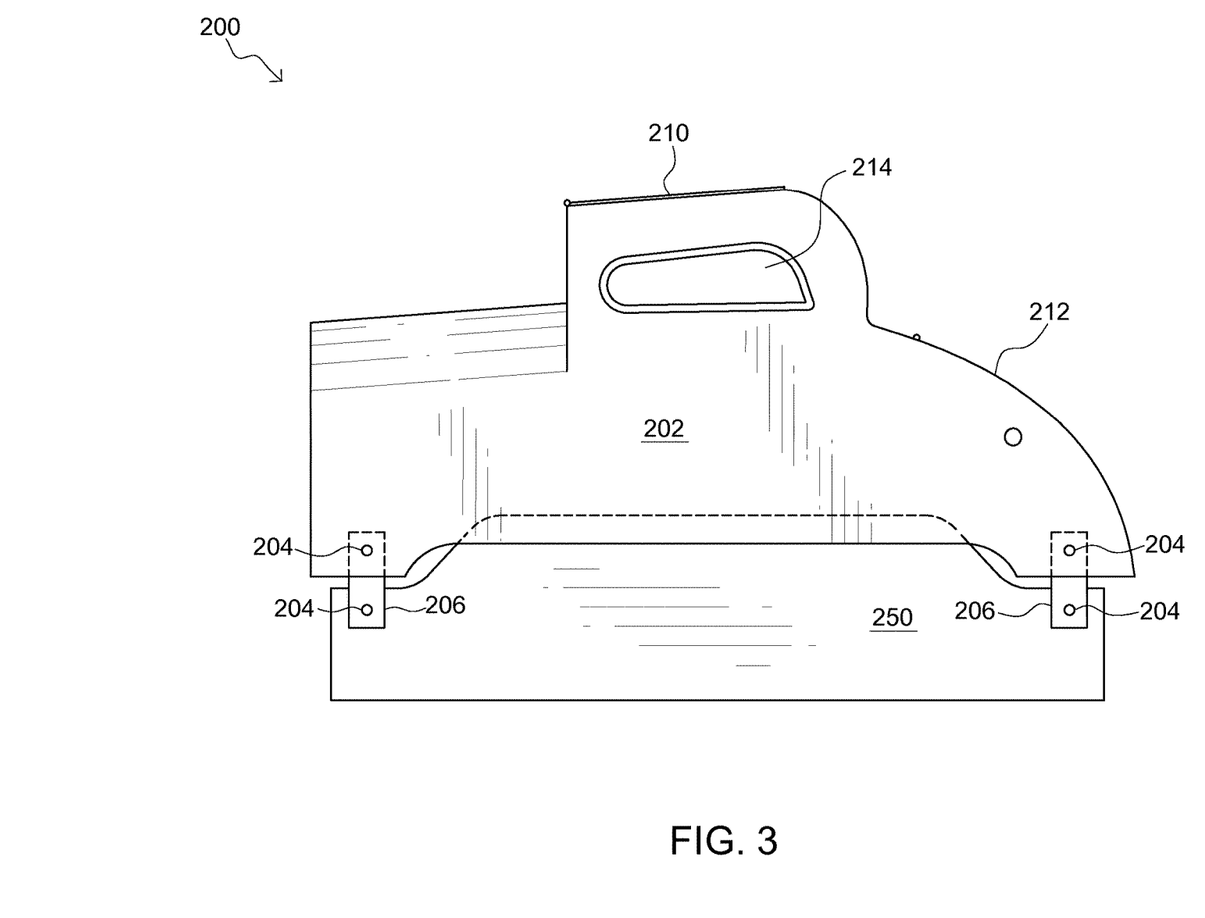
FIG. 3 is a side view of an automobile lawn mower cover according to one embodiment of the present invention.

Referring to FIG. 3, a second embodiment 200 of a lawn mower cover is illustrated. The lawn mower cover 200 can be implemented to provide an aesthetically pleasing and functional cover for a push lawn mower 250. The cover 200 can be generally shaped like a vehicle. For illustrative purposes only, the cover 100 is shown illustrated as an automobile. It is to be appreciated that the lawn mower cover 200 can be modeled after a variety of vehicles. For illustrative purposes, only the lawn mower cover 200 and a deck of the lawn mower 250 are illustrated. It is to be appreciated that the lawn mower 250 would include wheels, handle assembly, and other common parts of a lawn mower.

As shown, the cover 200 can include a body 202, a plurality of attachment structures 204, and a plurality of riser structures 206. The body 202 can generally be shaped like an automobile. It is to be appreciated that the body 202 can have other shapes. For instance, the body 202 can be modeled after ships, trains, boats, and other types of vehicles.

Generally, the four riser structures 206 can be adapted to attach near wheels of the lawn mower 250. For instance, the riser structures 206 can be coupled to a deck of the lawn mower 250. Typically, the attachment structures 204 can be implemented to secure the riser structures 206 to the lawn mower 250. Generally, the attachment structures 204 can include, but are not limited to, snap fasteners, hook and loop patches, screws, nuts and bolts, et cetera. It is to be appreciated that a variety of different attachment structures can be implemented without exceeding a scope of the present invention.

As shown in FIG. 3, the riser structures 206 can be adapted to extend upwards and provide attachment points for the body 202. For example, the riser structures 206 can be panels of metal having a substantially rectangular shape. It is to be appreciated that the riser structures 206 can have a variety of shapes without exceeding a scope of the present invention. Generally, the riser structures 206 can be configured to secure the body 202 to the lawn mower 250 above the deck of the lawn mower 250. By implementing the riser structures 206, a plurality of differently shaped automobile bodies can be implemented as a cover for the lawn mower 250.

After the riser structures 206 have been coupled to the lawn mower 250, the body 202 can be coupled to the riser structures 206, as shown in FIG. 3. For instance, the body 202 can be coupled to each of the plurality of riser structures 206. The attachment structures 204 can be implemented to couple the body 202 to the riser structures 206. In one embodiment, bolts can be implemented to couple the body 202 to the riser structures 206. Generally, the body 202 can include a plurality of predetermined attachment locations that can match up with the riser structures 206. In one embodiment, the body 202 can be removably coupled to the riser structures 206. In such an embodiment, a user can swap automobile covers for the lawn mower 250. For instance, a user can swap an automobile shaped cover for a boat shaped cover.

Similar to the first embodiment lawn mower cover 100, the second embodiment lawn mower cover 200 can include a plurality of adjustable panels 210, 212 and one or more openings 214.

To provide access to the lawn mower, the body 202 can include the plurality of adjustable panels 210, 212. In a typical implementation, the body 202 can include an adjustable roof panel 210 and an adjustable rear panel 212. It is to be appreciated that the body 202 can include more or less adjustable panels without exceeding a scope of the present invention.

The roof panel 210 can be implemented to allow access to an engine of the lawn mower. In one embodiment, the roof panel 210 can be rotatably coupled to the body 202. For instance, the roof panel 210 can have a hinged connection to the body 202. Similar to the first embodiment adjustable panels, the roof panel 210 can rotate from a closed position to an open position. In the open position, the roof panel 210 can allow access to the engine. For instance, a user can access a gas tank of the engine to fill with fuel. In another instance, the user can have access to common components of a lawn mower engine including, but not limited to, an oil dipstick and a choke.

The rear panel 212 can generally be located near a rear of the lawn mower platform. Generally, the rear panel 212 can be rotatably coupled to the body 202. For instance, the rear panel 212 can have a hinged connection to the body 202. Typically, the rear panel 212 can be included for lawn mowers having a clipping bag. For instance, the rear panel 212 can be rotated to an open position to allow the clipping bag to be attached to the lawn mower. When the clipping bag is not being used, the rear panel 212 can be rotated to the closed position.

To simulate automobile windows, the body 202 can include one or more openings 214. For instance, the one or more openings 214 can be included to simulate a rear window, a front window, and door windows. It is to be appreciated that the one or more openings 214 can be modeled after the type of automobile the body 202 is modeled after. Similar to the first embodiment cover 100, a pull cord of the lawn mower 250 can exit out a back opening 214 of the body 202 to a handle assembly of the lawn mower 250.

The second embodiment cover 200 has been described in detail as an automobile. It is to be appreciated that the components of the second embodiment cover 200 can be adapted to other vehicle types.

An Exemplary Implementation of a Lawn Mower Cover

In a typical implementation, the first embodiment lawn mower cover 100 and the second embodiment lawn mower cover 200 can be used similarly. Generally, after the cover has been attached to the lawn mower, a user can proceed to cut their grass with the cover attached to the lawn mower.

First, a user can attach the cover to the lawn mower. Depending on the embodiment, the user can either attach the cover to the handle assembly or riser structures. Once the cover is attached, the user can then move a pull cord of the lawn mower through a rear opening and attach the pull cord to the handle assembly. It is to be appreciated that the user will have detached the pull cord from the handle assembly before attaching the cover to the lawn mower.

Second, after the user has attached the cover, but before mowing the lawn, the user can open the top panel check to see if the lawn mower has adequate gas. If not, the user can proceed to fill the gas tank with the top panel in an open position. After the gas tank has been filled, the user can close the top panel. In one instance, the user can check an oil level of the engine while the top panel is open. Where the lawn mower includes a clipping bag, the user can open the rear panel and attach their clipping bag to the lawn mower.

Third, the user can then proceed to mow their grass with the cover attached. The cover can be left on the lawn mower and does not need to be removed after being attached.

An Embodiment of an Automobile Shaped Lawn Mower

Figure 4:
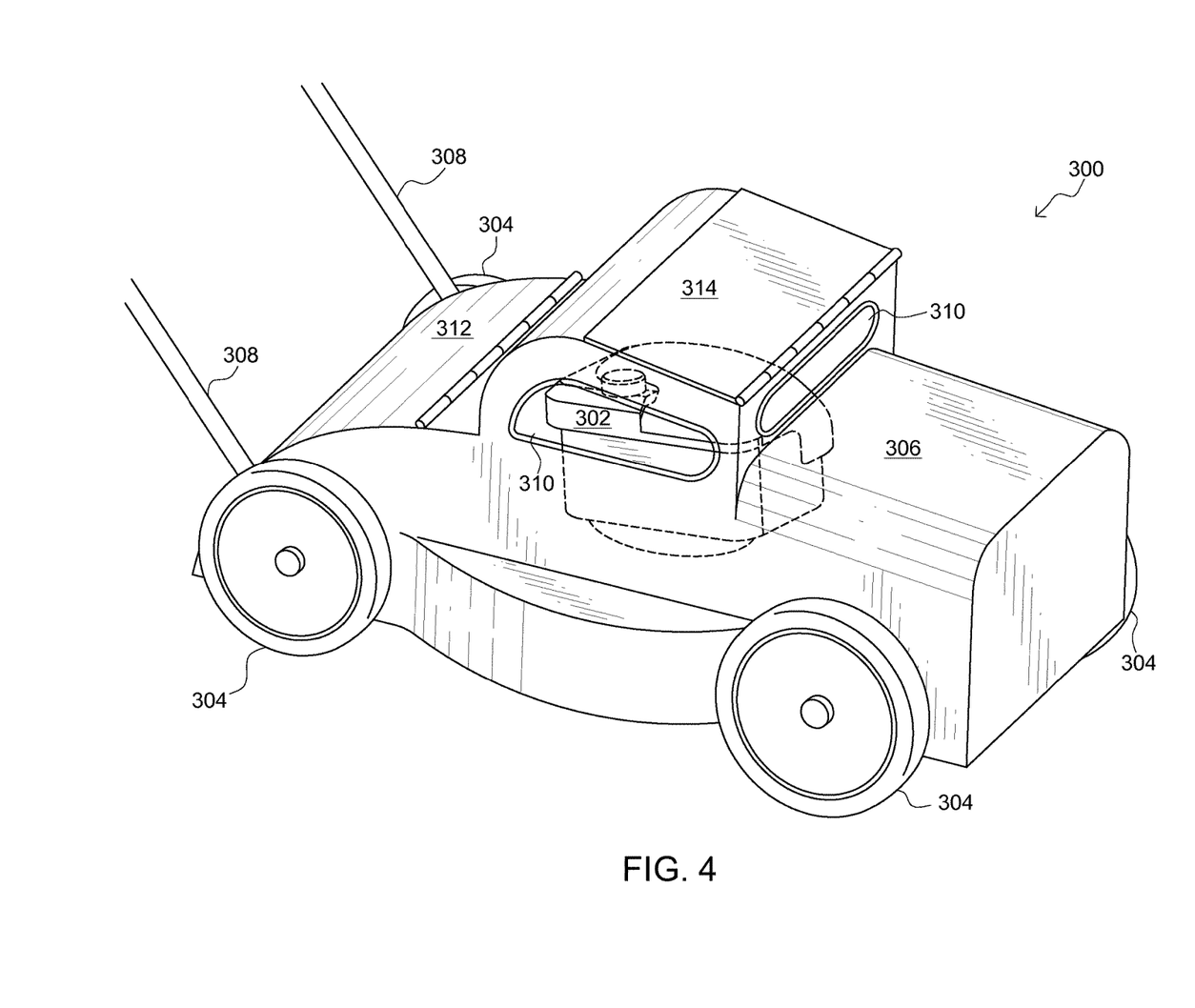
FIG. 4 is perspective view of an automobile shaped lawn mower according to one embodiment of the present invention.

Referring to FIG. 4, an embodiment 300 of an automobile shaped lawn mower is illustrated. The automobile shaped lawn mower 300 can generally be implemented with rotary push mowers. It is to be appreciated that the automobile shape could be implemented with other types of mowers.

As shown in FIG. 4, the automobile mower 300 can have a general look of an automobile with the functionality of a lawn mower. The automobile mower 300 can include general components of a rotary mower including, but not limited to, an engine, cutting blades, wheels, an automobile shaped frame, and a handle assembly. For illustrative purposes, FIG. 4 shows an engine 302, a plurality of wheels 304, an automobile shaped frame 306, and a handle assembly 308.

The automobile mower 300 can be constructed similar to a current push lawn mower. As shown, the engine 302 can be adapted to fit inside the automobile shaped frame 306. The wheels 304 can be attached to four corners of the automobile shaped frame 306. The handle assembly 308 can be attached to rear portion of the automobile shaped frame 306.

In one embodiment, the automobile shaped frame 306 can include a plurality of openings 310 and one or more adjustable panels 312. The plurality of openings 310 can be implemented to imitate automobile windows and provide access to the engine 302. Similar to the first embodiment lawn mower cover 100, a pull cord of the engine 302 can exit out a back opening 312 of the automobile shaped frame 306 to the handle assembly 308. Typically, the back opening 312 can resemble a rear window of an automobile.

Generally, the adjustable panels 312 can be implemented to provide access to the engine 302. As shown in FIG. 4, the adjustable panels 312 can include a roof adjustable panel and a trunk adjustable panel. The roof panel can allow access to the engine 302 and the trunk panel can allow access to a rear portion of the automobile mower 300.

Figure 5:
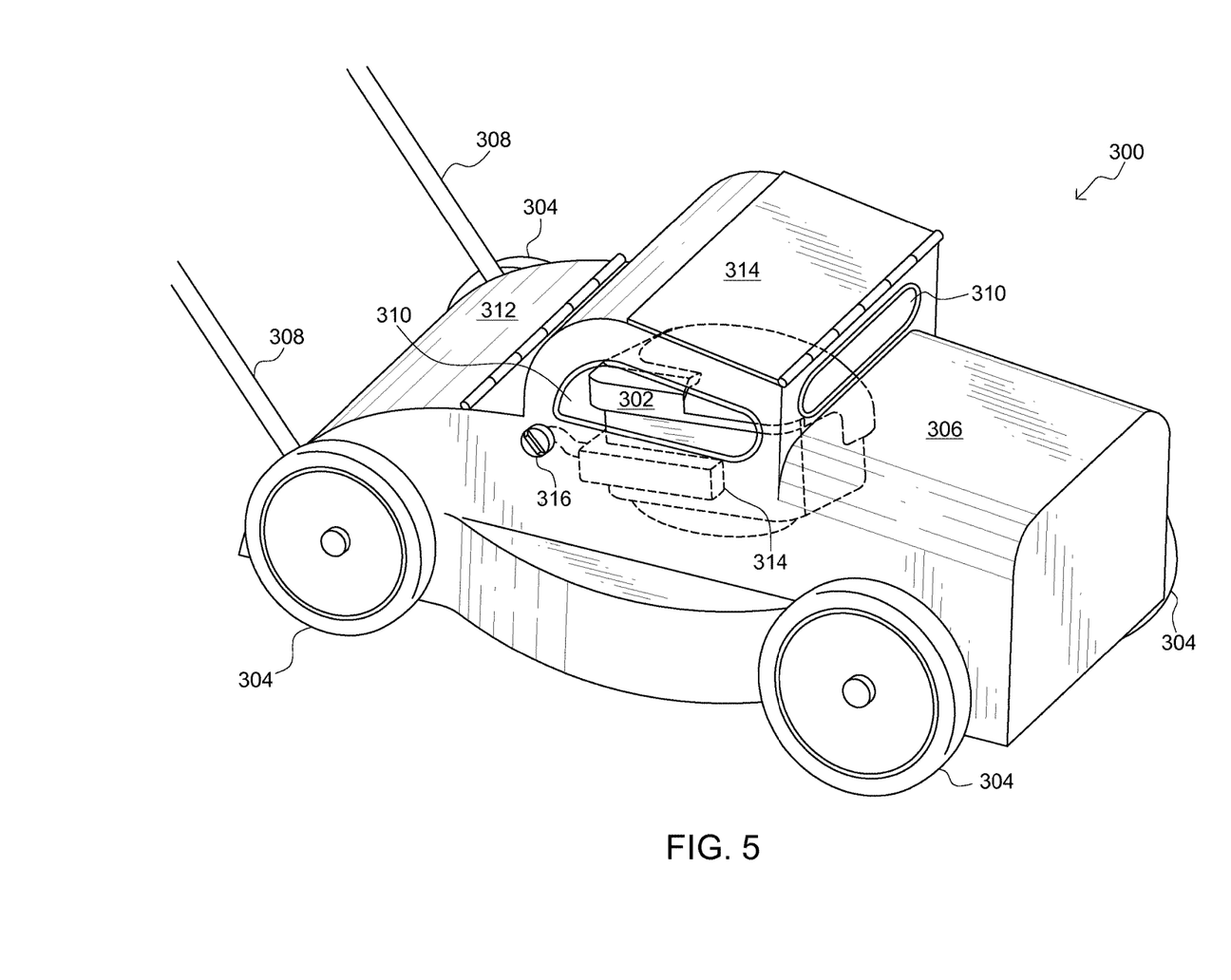
FIG. 5 is perspective view of an automobile shaped lawn mower having a gas intake according to one embodiment of the present invention.

Referring to FIG. 5, a detailed diagram of the automobile lawnmower 300 including a modified gas tank 314 and a gas intake 316 is shown. Depending on the type of automobile the mower 300 is modeled after, the mower 300 can include the gas intake 316 in a similar location of the modeled automobile. For instance, the gas intake 316 can be on a driver side of the mower 300 for automobile frames modeled after American cars. In one embodiment, a tube 318 can be implemented to connect the gas intake 316 to the gas tank 314 of the engine 302.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A combination comprising:
   an existing lawn mower including at least an engine having a first cover, a platform, four wheels, and a handle assembly; and
   a supplemental cover removably coupled to the existing lawn mower, the supplemental cover comprising:
      a body having an automobile shape, the automobile shape including:
         a first opening simulating a rear window, wherein a pull cord of the lawn mower passes through the first opening;
         a second opening simulating a front window;
         a third opening simulating a passenger side window; and
         a fourth opening simulating a driver side window;
      at least one adjustable panel located on a roof of the body, wherein the adjustable panel provides access to the engine of the lawn mower;
      a plurality of attachment structures removably coupling the body to the handle assembly of the lawn mower; and
      a barrier layer outlining a bottom surface of the body, the barrier layer interfacing directly with the platform of the lawn mower.

2. The combination of claim 1, wherein the supplemental cover includes two adjustable panels.

3. The combination of claim 2, wherein (i) a first adjustable panel is located on a roof of the body and provides the access to the engine of the lawn mower and (ii) a second adjustable panel is located at a rear of the body.

4. The combination of claim 3, wherein the first adjustable panel and the second adjustable panel each have a hinged connection to the body.

5. The combination of claim 1, wherein the body includes one or more holes located approximate a rear portion of the body, the one or more holes adapted to receive one of the attachment structures.

6. The combination of claim 5, wherein the attachment structures couple the body to pre-drilled holes in the handle assembly of the lawn mower.

7. The combination of claim 1, wherein the barrier layer is manufactured from a material selected from a group consisting of foam, rubber, and plastic.

8. The combination of claim 1, wherein the supplemental cover includes a gas intake in addition to an existing gas intake of the existing lawn mower.

9. The combination of claim 8, wherein the gas intake of the supplemental cover includes a gas intake extension connected to the existing gas intake of the lawn mower.

10. A combination comprising:
    an existing lawn mower including at least an engine having a first cover, a platform, four wheels, and a handle assembly; and
    an automobile shaped cover coupled to the lawn mower, the automobile shaped cover including:
       at least one adjustable panel located on a top of the automobile shaped cover, wherein the adjustable panel provides access to an engine of the lawn mower;
       a plurality of attachment structures coupling the automobile shaped cover to a handle assembly of the lawn mower;
       a rear window, wherein a pull cord of the lawn mower passes through the rear window;
       a front window;
       a passenger side window;
       a driver side window; and
       a barrier layer outlining a bottom surface of the automobile shaped cover, the barrier layer interfacing directly with the platform of the lawn mower.

* * * * *